US006346693B1

(12) United States Patent
Kasevich

(10) Patent No.: US 6,346,693 B1
(45) Date of Patent: Feb. 12, 2002

(54) SELECTIVE HEATING OF AGRICULTURAL PRODUCTS

(75) Inventor: Raymond S. Kasevich, Mount Washington, MA (US)

(73) Assignee: KAI Technologies, Inc., Great Barrington, MA (US)

( * ) Notice: Subject to any disclaimer, the term of this patent is extended or adjusted under 35 U.S.C. 154(b) by 0 days.

(21) Appl. No.: 09/460,609

(22) Filed: Dec. 14, 1999

(51) Int. Cl.[7] ............................ H05B 6/68; H05B 6/72; F26B 3/347; G01N 22/04

(52) U.S. Cl. ........................ 219/746; 219/748; 219/707; 219/771; 219/780; 219/681; 219/757; 34/255; 34/265

(58) Field of Search ................................ 219/746, 748, 219/749, 678, 679, 695, 696, 697, 756, 762, 757, 681, 686, 764, 770, 772, 780, 771, 707; 34/255, 256, 259, 265

(56) References Cited

U.S. PATENT DOCUMENTS

| | | | | | |
|---|---|---|---|---|---|
| 2,446,557 | A | * | 8/1948 | Schultz et al. | 219/772 |
| 3,214,562 | A | * | 10/1965 | Sargeant | 219/772 |
| 3,532,847 | A | * | 10/1970 | Puschner | 219/748 |
| 4,221,948 | A | * | 9/1980 | Jean | 219/748 |
| 4,222,176 | A | * | 9/1980 | Tjurin et al. | 34/265 |
| 4,326,163 | A | | 4/1982 | Brooke | |
| 4,567,340 | A | * | 1/1986 | Latchum, Jr. | 219/775 |
| 4,571,473 | A | * | 2/1986 | Wyslouzil et al. | 219/748 |
| 5,420,404 | A | * | 5/1995 | Goodman et al. | 219/775 |
| 5,481,435 | A | | 1/1996 | Werther | |
| 5,939,888 | A | | 8/1999 | Nelson | |
| 5,950,325 | A | * | 9/1999 | Mehdizadeh et al. | 34/256 |

FOREIGN PATENT DOCUMENTS

JP 2-8684 * 1/1990

OTHER PUBLICATIONS

Abstract: Japanese Application No. 63155590, published Jan. 12, 1990, "Apparatus and Method for High Frequency".

Abstract: Japanese Application No. 01026108, published Aug. 17, 1990, "Grain Treating Device in Grain Dryer".

Abstract: Japanese Application No. 10116926, published Nov. 5, 1999, "Moisture Content Measuring Instrument".

Nelson, "Review and Assessment of Radio–Frequency and Microwave Energy for Stored–Grain Insect Control", Transaction of ASAE, vol. 39(4), pp. 1475–1484, 1996.

Daily et al., "Electrical Resistivity Tomography of Vadose Water Movement", Water Resources Research, vol. 28, No. 5, pp 1429–1442, May 1992.

Kelley et al., "Piecewise Linear Recursive Convolution of Dispersive Media Using FDTD", IEEE Transactions on Antennas and Propagation, vol. 44, No. 6, pp 792–979, Jul. 1996.

Stuart O. Nelson, "Review and Assessment of Radio–Frequency and Microwave Energy for Stored–Grain Insect Control", Transactions of ASAE, vol. 39, No. 4, pp 1475–1484, 1996.

Stuart O. Nelson, "RF and Microwave Energy for Potential Agricultural Application", Journal of Microwave Power, pp 65–70, 1985.

* cited by examiner

*Primary Examiner*—Philip H. Leung
(74) *Attorney, Agent, or Firm*—Fish & Richardson P.C.

(57) ABSTRACT

A grain containment vessel equipped with one or more antennas and a vapor extraction system is disclosed. An electromagnetic heating pattern is established throughout the grain volume elevating the bulk temperature, while an air flow is applied throughout the grain volume. The electromagnetic energy desorbs the water and increases the vapor pressure and the air flow carries the heat and water from the containment vessel. A controlled amount of electromagnetic energy is introduced into the grain volume to reduce or eliminate fungus infestation and increase insect mortality.

12 Claims, 10 Drawing Sheets

SELECTIVE HEATING OF AGRICULTURAL PRODUCTS

This invention relates to heat treatment of grain, and more particularly, for the purpose of controlling moisture content of grain and insect infestation.

BACKGROUND OF THE INVENTION

When moisture content of stored agricultural products (e.g., grain and cereals) exceeds acceptable limits, the products can deteriorate rapidly, leading to the development of mold and potentially dangerous toxins. In addition, storage of agricultural products (e.g., in silos) having high moisture can significantly increase the likelihood of insect infestation. These problems are particularly problematic in wet and/or high humidity climates.

To control moisture content, heaters and blowers can be used to dry the product before delivery. Drying in wet areas and conditions in this manner has become a routine procedure on farms, and can be costly and time-consuming. In addition to drying, agricultural product stored in bulk silos is normally treated with chemicals such as phosphine to prevent fungi and insects from proliferating and destroying the product. Although the chemicals have been helpful in saving the product from insect destruction, they are not always completely effective and pose a great danger to personnel handling them. Additionally, since the chemicals are not desirable for human consumption, the chemical residues on the treated product must be held below certain levels for safe consumption as human food.

SUMMARY OF THE INVENTION

The invention relates to a system which provides selective and volumetric heating of material within a containment vessel in a safe manner. This approach is used to advantageously remove moisture stored with agricultural products (e.g., grain), and in certain applications, increase the mortality of insects living within the agricultural product stored in the containment vessel.

In one general aspect of the invention, the heating system includes a transmission network configured to receive electromagnetic energy and having a first conductor extending substantially along a longitudinal axis of the containment vessel, and at least one additional conductor disposed parallel to the first conductor and positioned near a surface of a wall of the containment vessel.

Various implementations of this aspect of the invention may include one or more of the following features.

The first conductor is positioned to effectively radiate the contents of the containment vessel. For example, in one implementation, the first conductor is disposed substantially along a longitudinal axis of the containment vessel. The additional conductor is disposed substantially in parallel to the first conductor, for example, within the containment vessel.

In other embodiments, there may be a number of additional conductors spaced from the first conductor. For example, the wall of the containment vessel may be cylindrically-shaped with the additional conductors spaced around, or even embedded within, the perimeter of the wall.

The system includes an air blower connected to the grain containment vessel, and a heat exchange system connected to the grain containment vessel. The system can include an electromagnetic energy source connected to the first conductor.

In certain embodiments, one or more of the conductors are positioned outside the containment vessel and provide electromagnetic energy through an aperture contained in the containment vessel wall. In this embodiment, a grain vapor extraction system may be used to provided additional heating within the containment vessel.

In another aspect, the invention features a method for removing moisture from grain in a containment vessel, including positioning an antenna in the containment vessel and operating the system to radiate energy to heat moisture in the grain.

Embodiments of this aspect of the invention may include one or more of the following features.

The method includes operating the system to radiate sufficient energy to remove moisture from the grain. Airflow is provided into the grain to move heated air within the containment vessel to provide uniform heating of the grain. The airflow is continuously provided through the grain to keep the heat of the grain below the latent heat of vaporization of water. The method further comprises increasing the mortality of insects within the grain by operating the antenna to radiate energy to heat the insects in the grain. For example, the electromagnetic energy is provided at a frequency (e.g., 1 MHz to 1000 MHz), power level (e.g., 10 Kwatts to 50 Kwatts) and duration (e.g., 3 to 13 seconds) which is lethal to insects.

Among other advantages, the heating system and method described above, controls grain moisture levels and increases the mortality of insects present in grain containment vessels. The system and method accomplishes these advantages through selective energy absorption, while operating the systems at low energy levels, thereby realizing a significant energy saving: Further advantages include providing insect and fungus control without the use of toxic chemicals.

In yet another aspect, the invention features a method of measuring the moisture content of grain in a containment vessel, including placing an electromagnetic device in the containment vessel, operating the electromagnetic device to radiate a first energy into the grain, measuring a second energy emanating from the grain, comparing the second energy emanating from the grain to the first energy radiating into the grain, extracting a first electromagnetic parameter from the comparison of the first and second energies, comparing first electromagnetic parameter with a known dry grain electromagnetic parameter and operation the electromagnetic device until the first electromagnetic parameter substantially matches the known dry grain electromagnetic parameter.

In one implementation, the first electromagnetic parameter is the dielectric constant of the grain.

Other features and advantages will be readily apparent from the following description, the accompanying drawings and the claims.

DETAILED DESCRIPTION

Figure 1A:
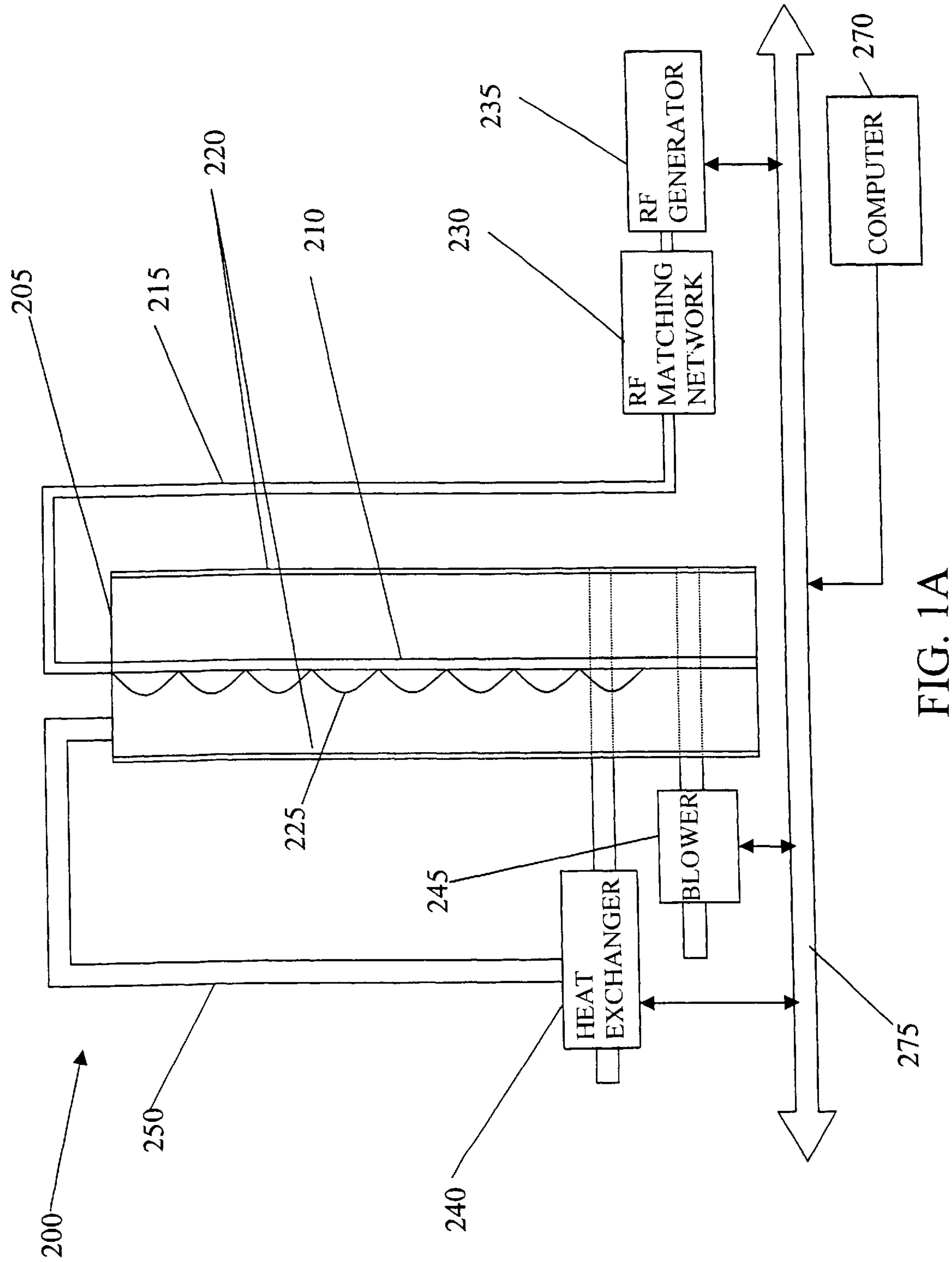
FIG. 1A is a side view of a heating system positioned within a grain silo.
Figure 1D:
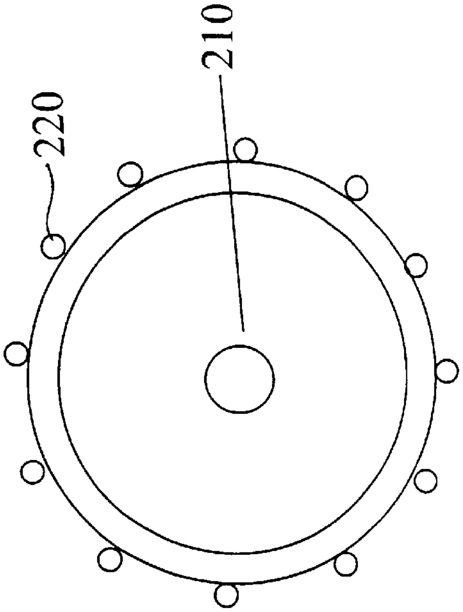
FIG. 1D illustrates a top view of another alternative embodiment of a heating system within a grain silo.
Figure 1B:
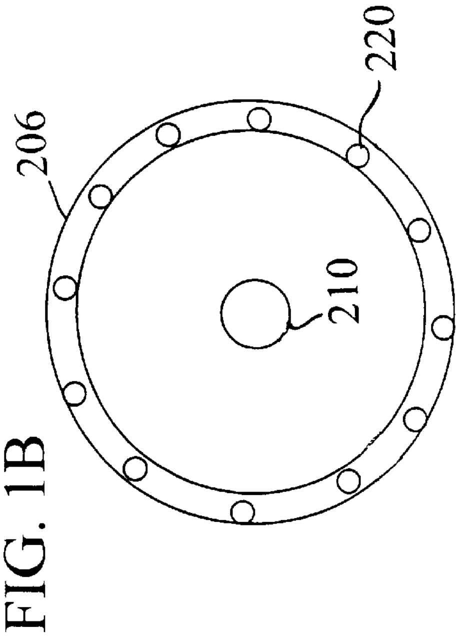
FIG. 1B illustrates a top view of the system of FIG. 1.
Figure 1C:
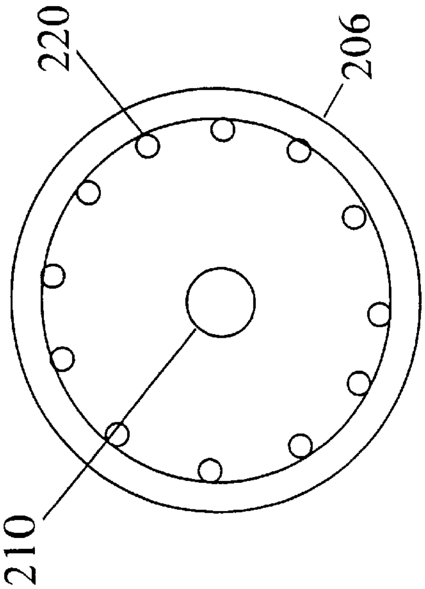
FIG. 1C illustrates a top view of an alternative embodiment of a heating system positioned within a grain silo.

Referring to FIGS. 1A and 1B, a heating system 200 for removing moisture from grain and increasing the mortality of insects present within a silo 205 is shown. Silo 205 serves as a containment vessel for storing grain, which may include any of a variety of different agricultural products such as rice, corn, soya beans, wheat. Heating system 200 achieves these objectives through selective energy absorption, details of which will be discussed in greater detail below.

Grain silo 205 is of the type constructed of cement and having a cylindrical shape. For example, grain silo 205 may be about 100 feet high and have a diameter of about 25 feet. Heating system 200 includes a center conductor 210 which extends substantially along the longitudinal axis 204 of the silo 205 and is used to apply radio frequency (RF) energy to the grain.

Heating system 200 also includes angularly-spaced steel support rods 220 embedded within the cement wall, around the perimeter of the silo and parallel to a longitudinal axis 204 of the silo (only two rods 220 are shown in FIG. 1A) to reinforce the cement. The center conductor 210 represents a positive electrode with respect to the outer rods 220 which are at system ground. The center conductor 210 and the outer support rods 220 of the silo together provide a transmission line network for radiating the grain within the silo. In particular, the transmission line network is in the form of a quasi-coaxial transverse electromagnetic (TEM) mode cylinder, the lowest order mode supported by the cylinder. Although the TEM mode, in this embodiment, is the mode of interest for transferring energy into the grain silo in other embodiments, higher order modes can be used to transfer energy into the silo. The RF energy is bounded circumferentially between the center conductor 210 which acts as a radiating element and the ring of support rods 220 which acts as the outer conductor of the TEM cylinder. The energy propagates between the center conductor 210 and the rods 220 in a standing wave pattern 225 along the length of the center conductor 210 thereby establishing an RF heating pattern throughout the grain volume which elevates the bulk temperature of the grain uniformly.

An RF transmission line 215 is connected between the center conductor 210 and an RF matching network 230. In this embodiment, transmission line 215 is a coaxial cable having a center conductor spaced from an outer conductor by a dielectric to provide a transmission line with a characteristic impedance of 50 ohms.

Referring again to FIG. 1A, RF generator 235 generates the RF signal to be transmitted, via transmission line 215, to the center conductor 210 where energy is radiated into the grain. The RF matching network 230 provides impedance matching between the RF generator 235 and the grain in the silo 205. Since the grain has a variable impedance due to, among other things, moisture content in the grain as well as varying conditions in the grain, impedance matching is used to provide maximum power transfer of the RF energy from the standing wave 225 into the grain. In one embodiment, a tuning slug (not shown) is positioned on the transmission line 215. Energy reflected from the center conductor 210 back to RF generator 235 is monitored and used to improve the impedance match by, for example, adjusting the position of the tuning slug. In particular, the reflected RF energy is detected with an RF detector which generates a voltage signal that is converted into a digital signal and received by a controller 270. In one embodiment, controller 270 generates a signal to move the tuning slug until the impedance match is optimized. The controller 270 communicates with the RF generator 235 and RF matching network 230 through a bus 275.

Figure 2:
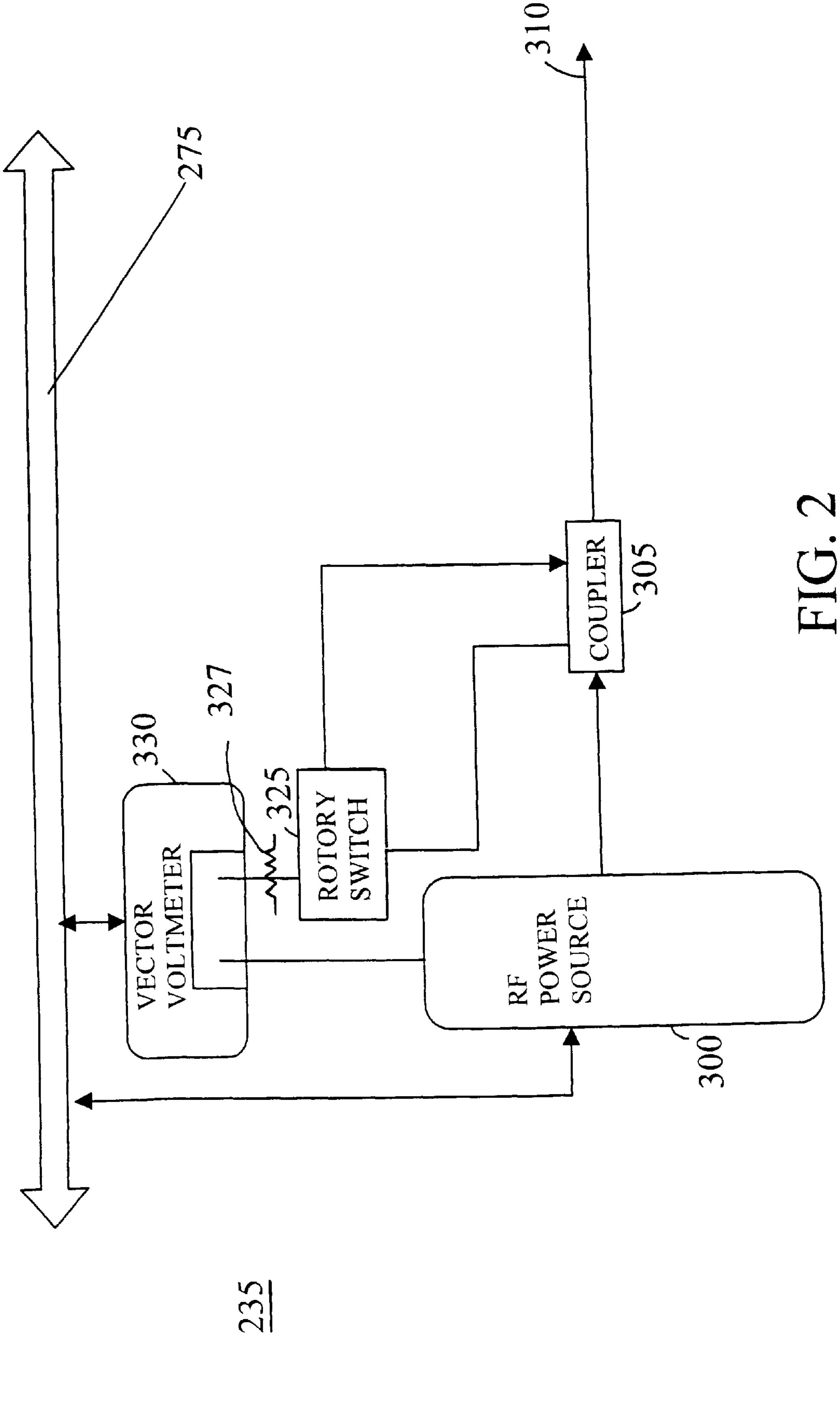
FIG. 2 illustrates an electromagnetic source suitable for use with the heating systems of FIGS. 1A–1D.

Referring to FIG. 2, RF power system 235 includes a single-channel RF power source 300 coupled to an output port 310. In this particular embodiment, power source 300 is capable of providing approximately 10 Kwatts to 50 Kwatts of power at 27.12 MHz to transmission line 215. The output port 310 is coupled to the output of the RF source through a bidirectional coupler 305. A fraction (e.g., 20 dB) of the output power from RF power source 300 is tapped from the coupler 305 and provided to a vector voltmeter 330 through a rotary switch 325. An RF attenuator 327 (e.g., 30–50 dB) is connected between the output of the vector voltmeter 330 and the rotary switch 325 to protect the vector voltmeter from excessice power levels. The RF power source 300 and the vector voltmeter are both controlled by controller computer (FIG. 1A) via computer bus 275.

To reduce cost of the system, RF power system 235 is preferably operated in pulse mode, for example, with a 50% duty cycle. The duty cycle can also be varied to maximize removal of moisture and increase insect mortality. A first duty cycle can be selected to maximize removal of moisture, and upon reaching a satisfactory moisture level (e.g., <1%), a second duty cycle is selected to maximize insect eradication. In essence, operating at the first duty cycle lowers the overall moisture content in the silo, thereby reducing background absorption.

In this lower moisture background, the RF power system is switched to a mode of operation in which the duty cycle as well as the amplitude is changed to provide, for example, higher energy pulsing for more effective insect destruction.

Referring again to FIG. 1A, a grain vapor extraction system (GVE) includes a heat exchanger 240 which provides a controlled flow of heated air throughout silo 205. The GVE also includes a blower 245 connected to a bottom portion of the silo 205 to provide a controlled discharge of air from the bottom of the silo 205 to the top of the silo. A pipe 250 extends from the top of the silo 205 to a return port of the heat exchanger 240. Thus, the pipe provides a return path for the air and evaporated moisture. The GVE works to minimize the RF energy required by the heating system to remove moisture from the grain. By increasing the vapor pressure of the moisture in the grain and discharging a controlled amount of air flow through the grain, evaporative cooling will occur at temperatures below the latent heat of vaporization of free water. The latent heat of vaporization of water occurs at 100° C. at sea level atmospheric pressure. Thus, heating system 200 and GVE provide vapor removal as a combination of both electromagnetic heating and mechanical heating. As the RF heating pattern is established through the grain volume to desorb the water from the grain and increase the vapor pressure of the free water throughout the volume, the simultaneous application of the vertical air flow carries heat and water vapor to the outside of the silo 205 where the hot water is condensed and stored. The warm air is recycled through heat exchanger 240 and pipe 250 into the grain volume within silo 205 for an enhancement of the overall process energy efficiency. The demoisturizing process is discussed in further detail below.

Before, during, or after the demoisturizing process has occurred, a controlled amount of RF energy from heating system 200 is introduced into the grain within silo 205 to reduce or eliminate insect or fungus infestation. The insect deinfestation process is discussed in further detail below.

As discussed above, apparatus and systems described above are controlled by the computer 270. The control bus 275 interfaces the computer 270 with the RF generator 235, the blower 245 and heat exchanger 240. Computer 270 also controls RF matching network 230.

Figure 3A:
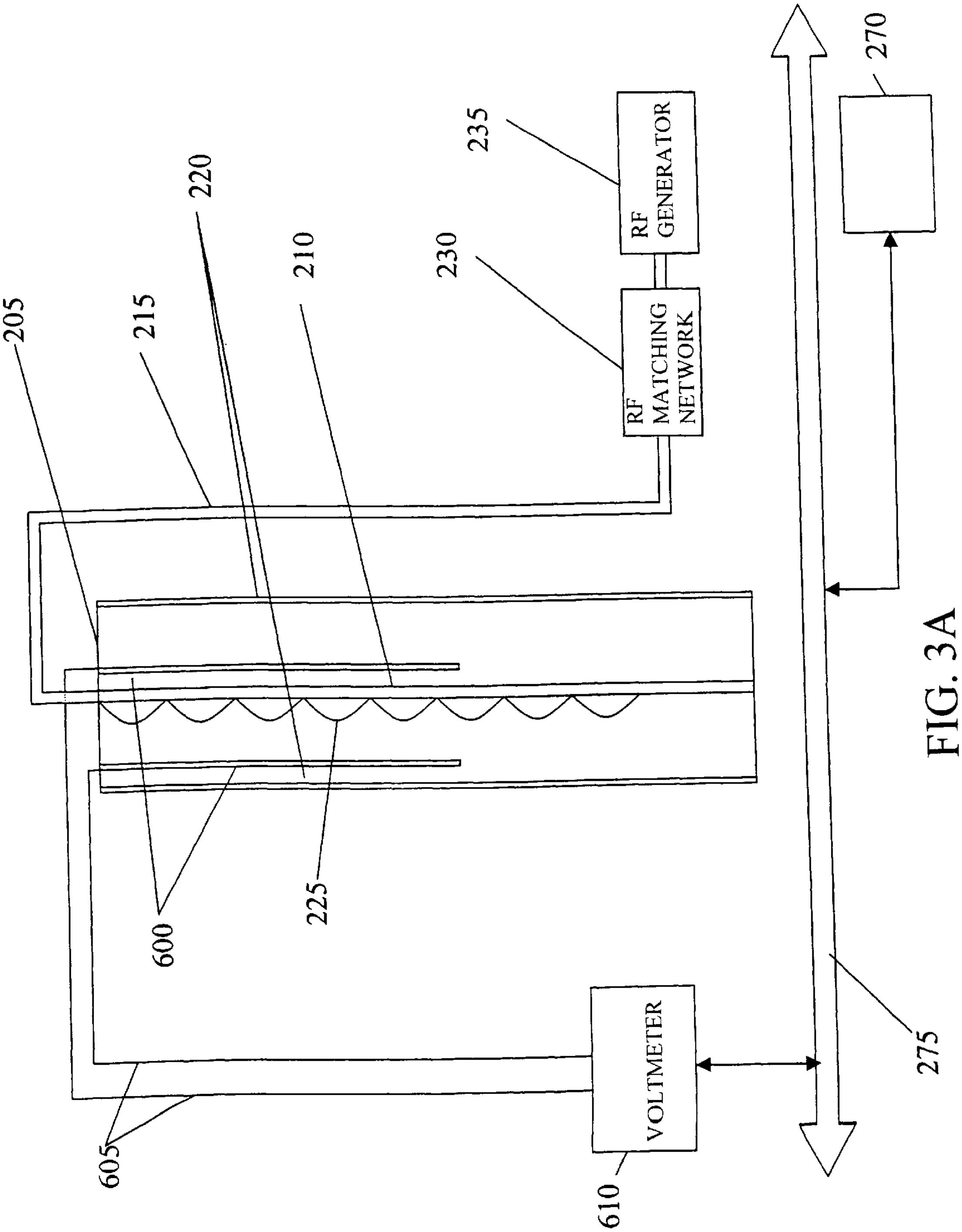
FIG. 3A is a side view of an alternative embodiment of a heating system including a measurement system.

The dielectric properties of dry/moist grain will now be discussed with reference to FIG. 3A which illustrates a grain silo with an antenna heating system 205 similar to system 200 as shown in FIG. 1A, but containing an apparatus for measuring the dielectric properties of grain. The heat exchanger 240, pipe 250, and blower 245 are not shown in FIG. 3A for purposes of clarity.

The TEM standing waves propagating within the grain silo 205 contain energy which transfers power into the grain to heat and remove the moisture from the grain. In the simplest form, the energy contained in a TEM wave includes terms representing an average power of the wave, a time-varying portion representing the redistribution of energy as the wave propagates, and a position-varying component representing the redistribution of energy as the wave moves through the grain. The wave number position-varying component varies depending on the conditions of the grain at a position in the silo 205.

As the TEM waves propagate through the grain silo 205 they will lose energy into the grain through dielectric heating. This dielectric heating is used to heat the grain, thereby removing moisture and increasing insect mortality. By controlling the energy input into the TEM waves, selective heating is accomplished.

Referring again to FIG. 3A, a system for controlling the energy input is shown. In this implementation, additional potential measurement rods 600 are inserted in the grain silo 205. The potential measurement rods 600 are attached to a multi-input voltmeter 610 via connecting wires 605. The multi-channel voltmeter is, in turn, interfaced with the computer 270 via the computer bus 275. Since the TEM mode cylinder 200 is, in essence, a cylindrical capacitor, there will be an associated capacitance and potential difference between the walls and a center conductor 620 of the silo 205. The grain in the silo 205 serves as the dielectric material inside the silo 205. The rods 600 are used to measure the capacitance/potential difference of the quasi-coaxial TEM cylinder.

Figure 3B:
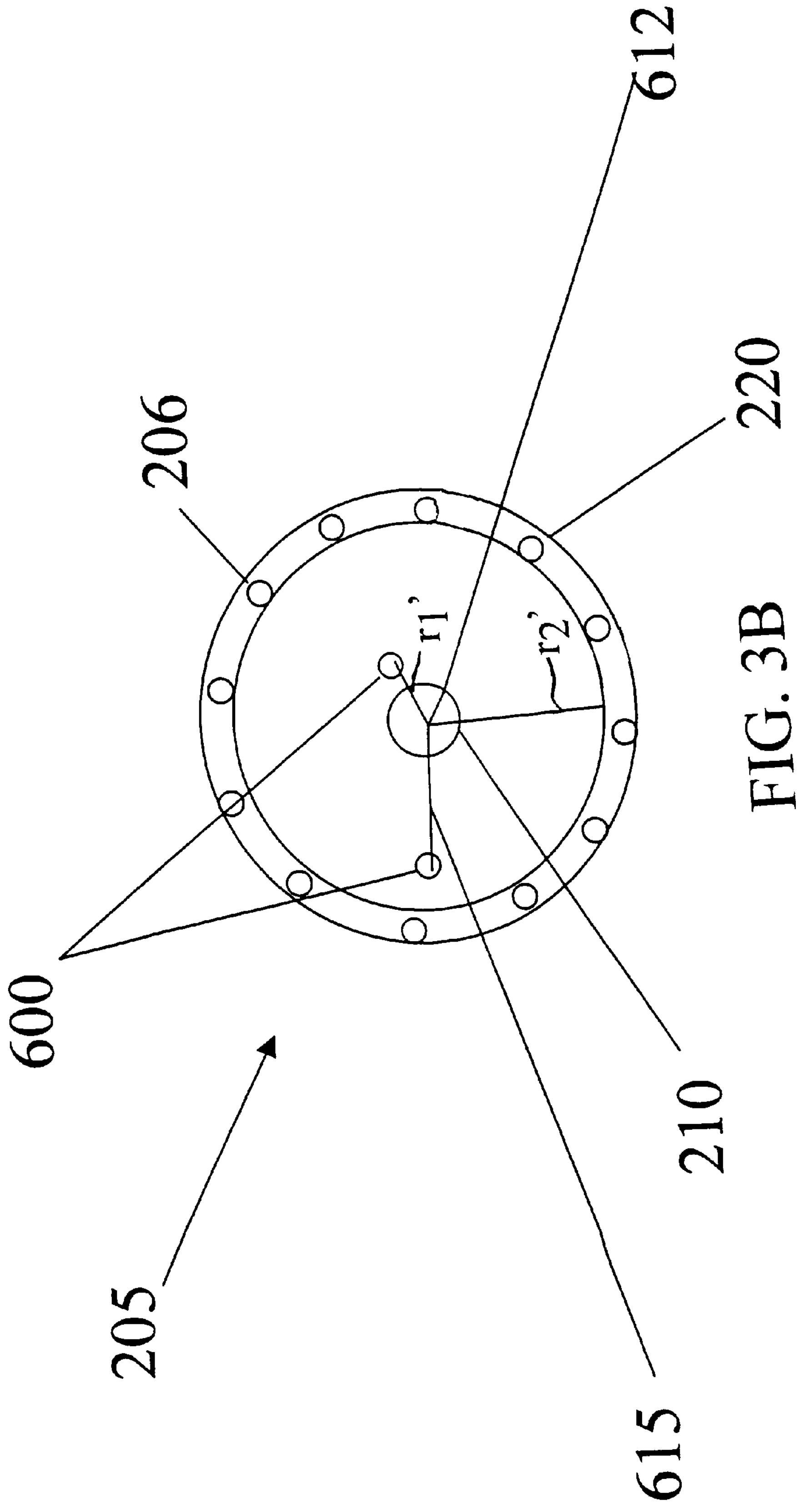
FIG. 3B illustrates a top view of the heating system of FIG. 3A.

Referring to FIG. 3B, a top view of the grain silo 205 shows the outer conductor rods 220 within the enclosing wall of the silo 205. As depicted, the rods 600 are placed at different locations within grain silo 205 and relative to the center conductor 210. In this implementation, the center conductor 620 has a first radius 612 labeled $r_1$. A second radius 613 ($r_2$) extending from the center of the center conductor 620 to the outer edges of the support rods 220. In general, the capacitance of a cylinder is represented by:

$$C = \frac{2\pi\epsilon L}{\ln\left(\frac{r_2}{r_1}\right)} \quad (1)$$

where:

$\epsilon$ is the dielectric constant of the material (e.g., grain) located between the inner and outer conductors, and L is the length of the cylinder. For any point within the dielectric material the potential difference inside the cylinder can be determined from the relationship:

$$V_2 - V_1 = \frac{-Q}{2L\pi\epsilon}\int_{r_1}^{r_2}\frac{dr}{r} \quad (2)$$

Therefore, the rods 600 may be placed at different radii in order to receive several potential readings at different locations in the silo. From the potential readings, the dielectric constants at those locations may be obtained. In this way, a uniform reading of the overall dielectric characteristic of the bulk grain can be obtained. FIG. 3B shows only two rods at radius $r_1'$ and $r_2'$. In other embodiments, additional rods may be placed inside the silo.

This data is downloaded to the computer 270 from the voltmeter 610, and software resident on the computer 270 is used to determine the dielectric constant for the grain. The extracted dielectric constant can be compared with the dielectric constant for dry grain. As the measured dielectric constant approaches the value of the dry grain dielectric constant, the computer 270 controls the RF generator 235 to lower the power. Alternatively, or along with reducing the power from RF generator 235, the computer 270 can also control the blower 245 and heat exchanger 240 to decrease the amount of air flow though the silo 205.

Figure 4A:
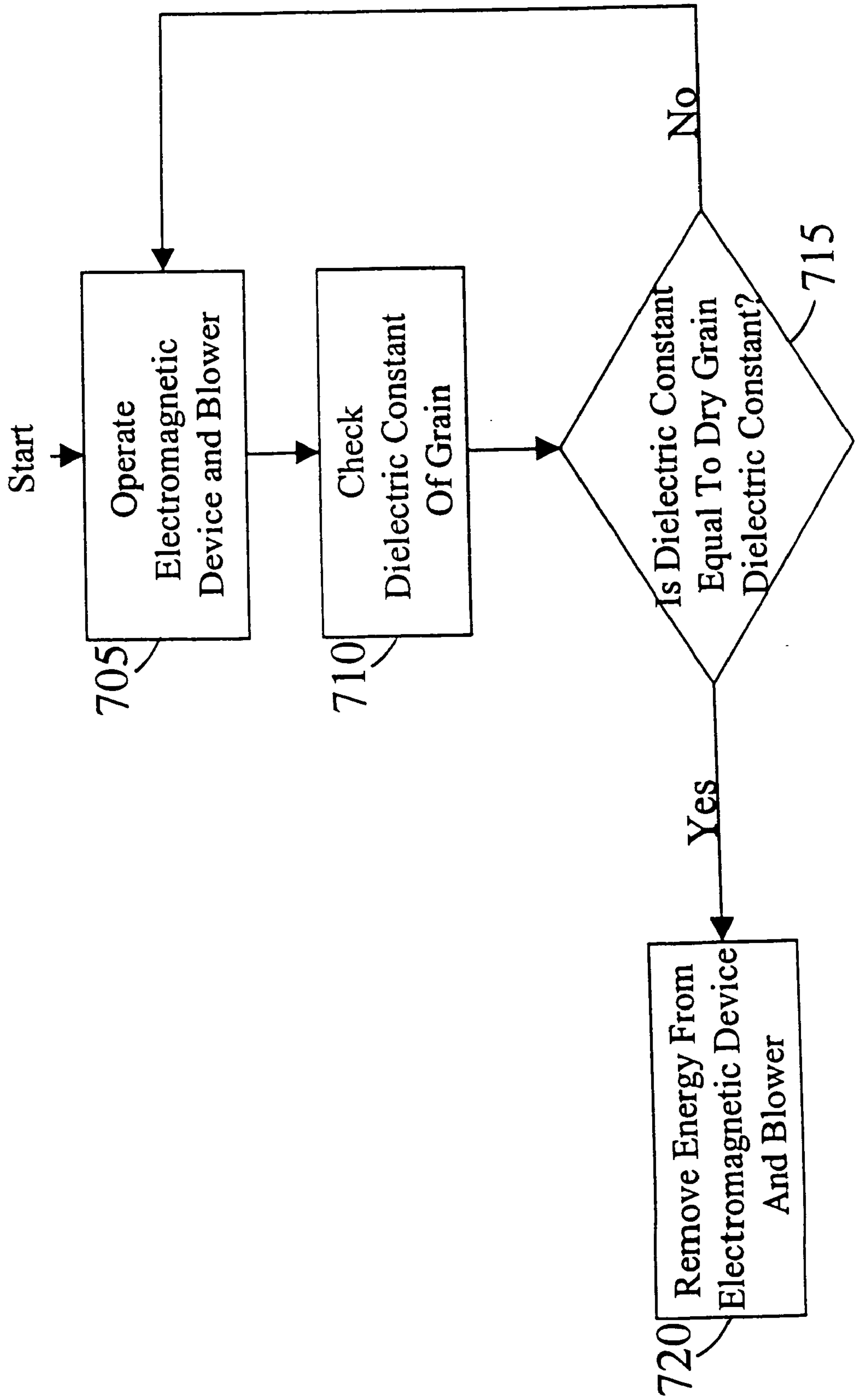
FIG. 4A is a flow chart illustrating a method for removing moisture from grain.

Referring now to FIG. 4A, a flow chart for a method for removing moisture from grain is shown. In step 705 the heating system 200 is activated to generate the TEM standing waves in the grain silo 205. Also in step 705, the blower 245 and heat exchanger 240 are powered up. In step 710, the dielectric constant of the grain is determined and compared with the desired dielectric constant of dry grain. If the desired constant has not been achieved 715, then the heating system and blower/exchanger continue to operate as in step 705. On the other hand, if the desired constant is achieved 715, then in step 720, computer 270 is used to reduce the output power from RF generator 235 and/or air flow from blower 245/exchanger 240.

Figure 4B:
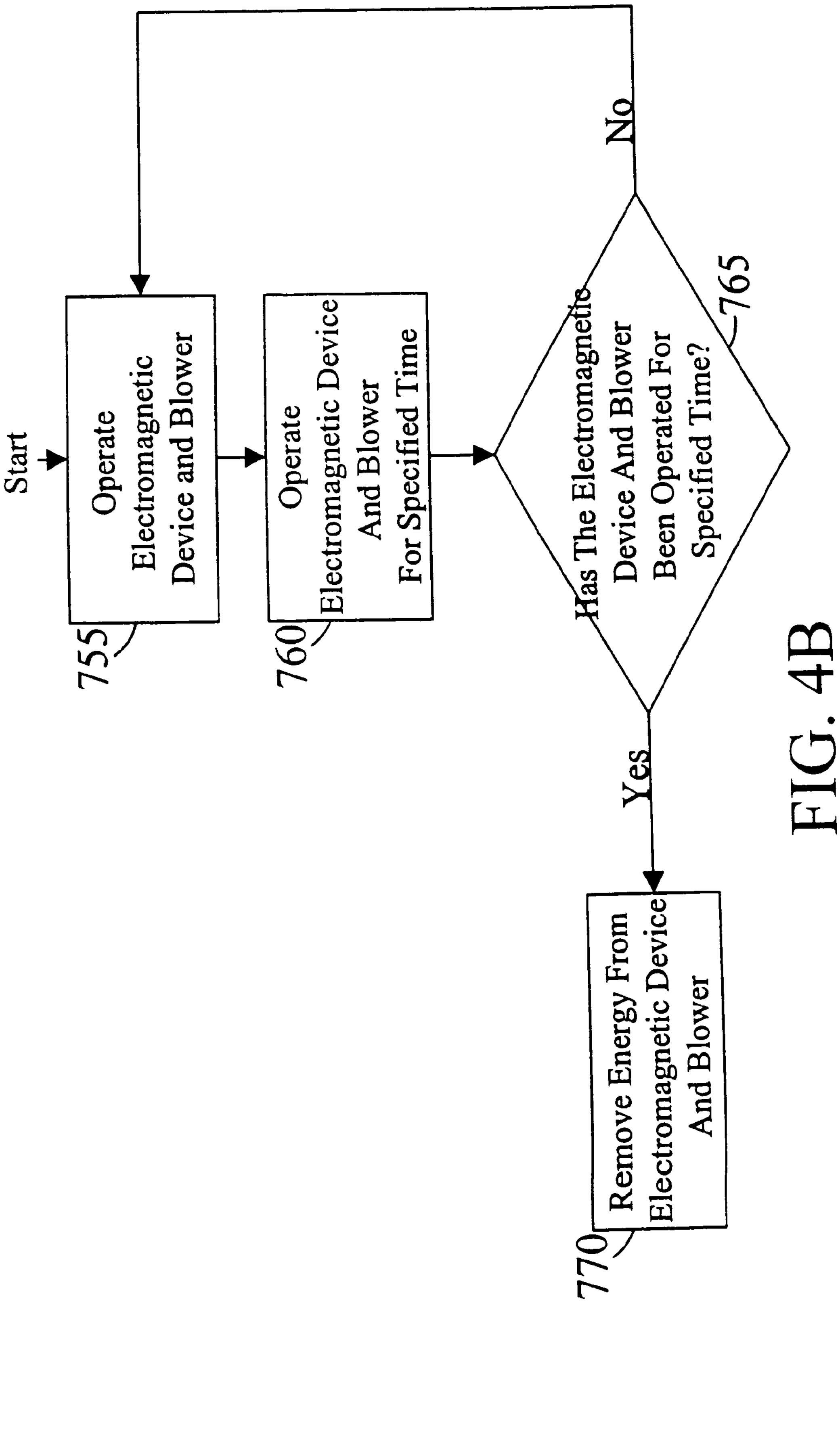
FIG. 4B is a flow chart illustrating a method for increasing the mortality of insects within the grain.

Referring to FIG. 4B, a flow chart for a method for increasing the mortality of insects within grain stored within grain silo 205 is shown. In step 755, the heating system 200 is activated to generate energy in the grain within the grain silo. Also in step 755 the blower and heat exchanger are powered-up. In step 760, the heating system 200 and blower 245/exchanger 240 operate for a predetermined time sufficient to kill the insects. When that predetermined time is reached (step 765), heating system 200 and blower 245/exchanger 240 are turned off (step 770).

Insect mortality through RF energy is most effective from a selective RF heating standpoint when the moisture level is low enough in the grain so as not to contribute significantly to the energy absorption from the dielectric heating process.

Thus, as discussed above, it is generally preferable to change the heating characteristics by changing the characteristics of the RF energy applied by RF power system 235.

In many cases, the RF energy characteristics for selective heating will be different than for insect destruction.

By way of example, hard red winter wheat, *Ttriticum aestivium* L and adult insects of the species rice weevil, *Sitophilus oryzae* L have been examined. The research parameters were examined over a range of frequencies between 39 MHz and 2450 MHz, at a power level between 10 Kwatts and 50 Kwatts and at 24° C. with 10.6% moisture. An advantageous range for selective heating and destroying the rice weevil was between 10 MHz to 100 MHz, where 3 to 3.5 times greater power dissipation could be expected in the insects than in the grain. Exposures of 3 seconds at 39 MHz produced 100% mortality in insects one week after treatment. Treatment at 2450 MHz required a 13 second exposure at the same heating rate for 100% mortality and resulted in much higher grain temperatures.

Figure 5A:
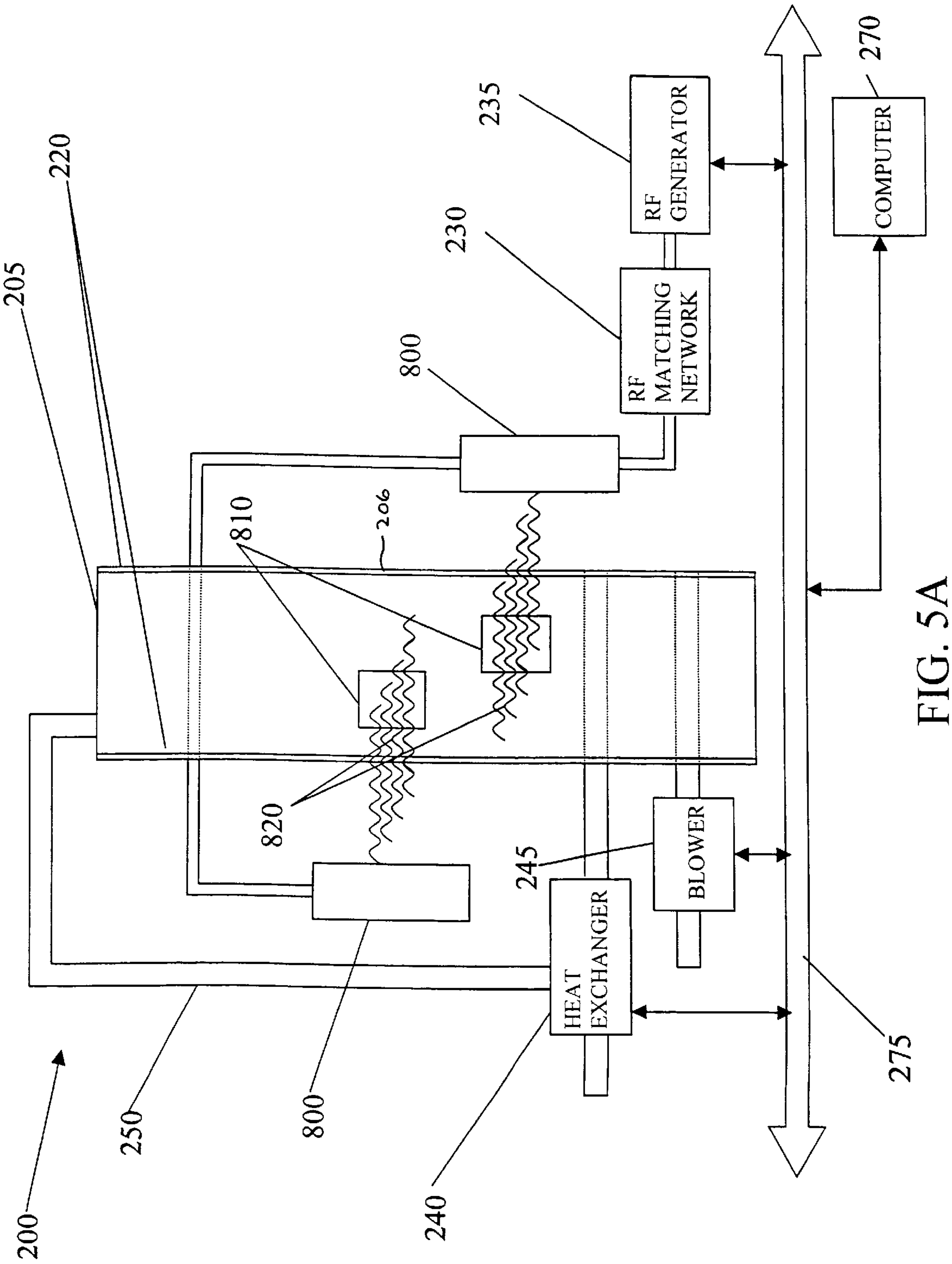
FIG. 5A illustrates a side view of another embodiment of a heating system having an exterior radiating structure.
Figure 5B:
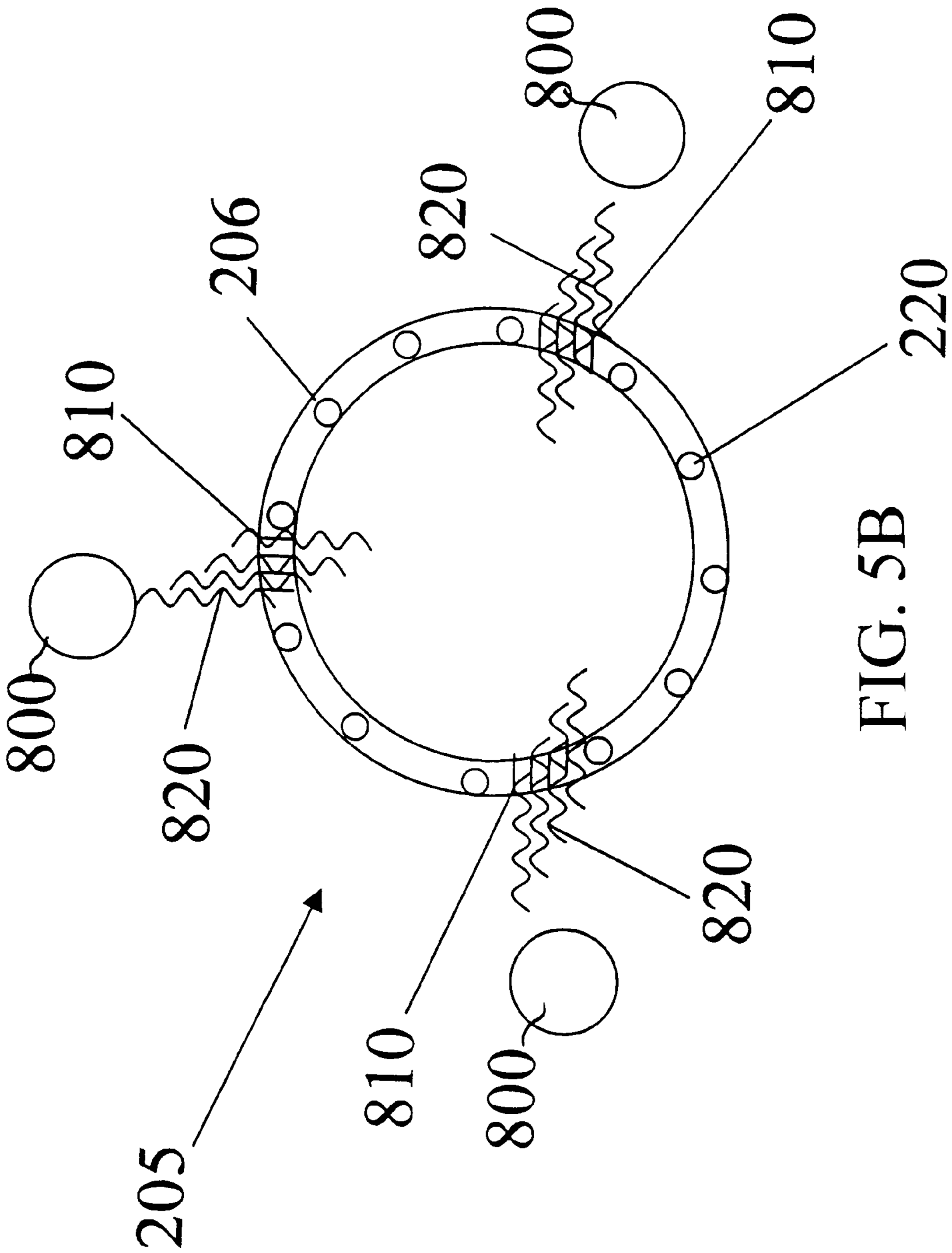
FIG. 5B illustrates a top view of heating system of FIG. 5A.

Referring to FIGS. 5A and 5B, a further embodiment of a system for heating grain in a silo 205 is illustrated.

In this embodiment, a grain silo includes a number of electromagnetic transmissive apertures 810. A series of radiating elements 800 may then be positioned near the apertures 810 and provide electromagnetic energy 820 into the apertures 810. In this embodiment, the radiating elements 800 are positioned at a relatively large distance from the silo 205 for illustrative purposes. In most applications, however, radiating elements 800 would be placed in close proximity to the apertures 810. In certain implementations, the apertures 810 may include actual holes cut into the silo with a grate covering the holes to prevent grain from leaking from the silo. In other embodiments, the holes may be covered with an energy transmissive material.

Referring in particular to FIG. 5B, a top view of the silo 205 and system are shown. Three radiating elements 800 are shown radiating electromagnetic energy 820 through apertures 810 in the silo wall 206 to heat grain inside the silo 205.

For example, although the case of a grain silo having a cylindrical shape was used as the model for the embodiments of FIGS. 1A–1D and 3A–3B, other embodiments are not limited to a cylindrical shape. For example, an embodiment of the grain silo heating system and related apparatus may be fitted for use with a silo having a rectangular or other polygonal shape.

In addition, if the concrete used to build the silo 205 does not include support rods, rods may be placed along the perimeter either along the exterior or interior of the silo walls. For example, referring to FIG. 1C, a top view of an implementation of the grain silo having support rods 220 placed periodically on the interior surface of enclosing wall 206. FIG. 1D illustrates a top view of an implementation of a grain silo having support rods 220 placed periodically on the exterior surface of the enclosing wall 206. In still other embodiments, the outer conductor may be in the form of a solid metal conductor (e.g., sheet metal) or as a screen or mesh.

Any of the foregoing may be supplemented by, or implemented in, specially designed application specific integrated circuits (ASICS).

Further, in the above embodiments, an RF matching network was used to optimize the impedance match between the RF generator and the grain stored within the silo. The RF matching network, in essence, allowed tuning to provide uniform heating of the grain while maintaining maximum power transfer of the RF energy from the generator to the grain. In other embodiments, optimizing the impedance match and providing uniform heating can be accomplished by varying the frequency of the RF energy provided by the RF generator. In the above embodiments, heating system 200 included a single radiating transmission line network to provide heating. In other embodiments, multiple structures for radiating the grain may be used. For example, RF energy from RF power system 235 can be divided (e.g., with a power splitter) to multiple conductors, similar to center conductor 210 in FIG. 1A. Multiple center conductors can be positioned at various positions within silo 205 and can be moveable, both axially and radially within the silo. By moving the center conductor(s), the heating pattern can be changed. In embodiments in which the radiating structure is stationary, varying the phase of the RF energy applied to the center conductors can also provide a varying heat pattern.

Figure 6:
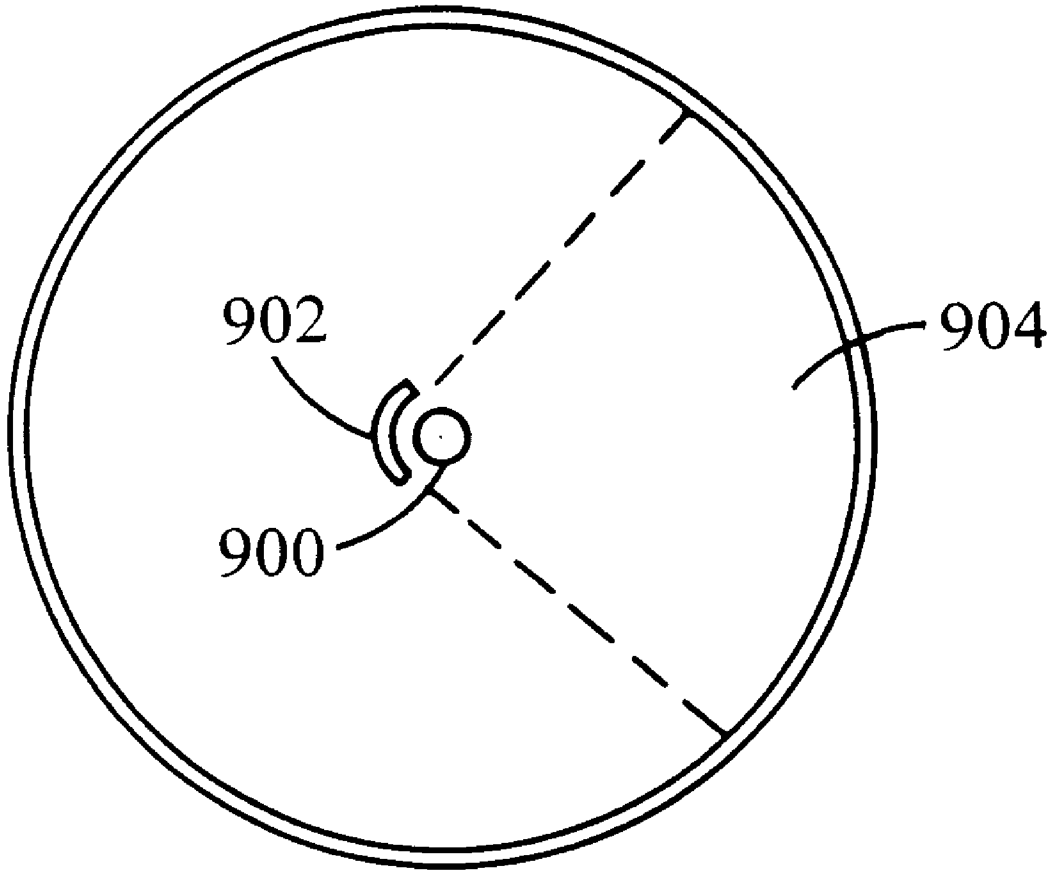
FIG. 6 illustrates a top view of an alternative embodiment of a heating system having a rotatable applicator.

Referring to FIG. 6, in another embodiment, a rotatable applicator 900 is positioned within silo 205 to selectively heat the grain. A portion of rotatable applicator 900 is surrounded by a reflector shield 902 which extends substantially the entire length of applicator. Reflector shield 902 redirects RF energy from RF generator 235 to a region of the volume of silo 205 bounded over an angular region 904. Applicator 900 and shield 902 are rotated together, for example with a motor (not shown), at a predetermined speed to sweep through the volume of the silo to heat the grain. In general, this approach increases the uniformity of heating of the grain at lower power levels.

Various implementations of the systems and techniques described here with respect to the computer 270 for controlling heating system 200 and GVE, as well as and related apparatus, such as test and measurement instrumentation (e.g., multichannel voltmeters) may be realized in digital electronic circuitry, or in computer hardware, firmware, software, or in combination thereof. Such test and measurement equipment can be, but is not limited to General Purpose Interface Bus (GPIB), VME, VME Extensions for Instrumentation (VXI), RS-232, and data acquisition/DSP equipment. The computer 270 may include a computer readable storage medium, configured with a computer program, where the storage medium so configured causes the computer to operate on input and/or generate output in a specific and predefined manner. The computer 270 may include one or more programmable processors that receive data and instructions from, and transmit data and instructions to, a data storage system, and suitable input and output devices. Suitable processors include, by way of example, both general and special purpose microprocessors.

Computer programs used with the computer 270 may be implemented in a high-level procedural or object-oriented programming language, or in assembly or machine language; such languages being compiled or interpreted.

Generally, a processor will receive instructions and data from read-only memory and/or a random access memory. Storage devices suitable for tangibly embodying computer program instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

A number of embodiments of the present invention have been described. Nevertheless, it will be understood that various modifications may be made without departing from the spirit and scope of the invention. Accordingly, other embodiments are within the scope of the following claims.

What is claimed is:

1. A heating system for removing moisture stored with grains, said system comprising:

a containment vessel stored with grains within the vessel, the vessel having a wall;

a transmission line network configured to receive electromagnetic energy, the transmission line network including:

a first conductor; and a second conductor angularly spaced with the first conductor to provide the electromagnetic energy within the grain material and remove the moisture;

a grain vapor extraction system of the containment vessel having an air blower to provide an airflow through the grains within the grain containment vessel and a heat exchange system for heating the airflow provided by the air blower and continuously providing airflow through the grains to keep the heat of the grain below the latent heat of vaporization of water;

an electromagnectic energy source connected to the first conductor; and a dielectric heating system for increasing insect deinfestation from the grains by operating an antenna heating system positioned outside the containment vessel.

2. The system of claim 1, wherein the first conductor is disposed substantially along a longitudinal axis of the containment vessel.

3. The system of claim 1, wherein the second conductor is disposed substantially in parallel to the first conductor.

4. The system of claim 1, wherein the second conductor is in the form of a plurality of additional conductors spaced from the first conductor.

5. The system of claim 4, wherein the wall of the containment vessel is cylindrically-shaped and the plurality of additional conductors are spaced around the perimeter of the wall.

6. The system of claim 5, wherein the plurality of additional conductors are embedded within the wall of the containment vessel.

7. The system of claim 1, wherein the grain vapor extraction system further comprises:

an air blower configured to provide airflow through the grains within the containment vessel; and a heat exchange system for heating the airflow provided by the air blower and continuously providing airflow through the grains to keep the heat of the grains below the latent heat of vaporization of water.

8. The system of claim 7, wherein the wall of the containment vessel includes at least one aperture for accommodating an antenna heating system positioned outside the containment vessel.

9. The system of claim 1, wherein the first conductor is rotatable about a longitudinal axis of the first conductor.

10. The system of claim 9, further comprising a reflector spaced from the first conductor and configured to redirect the electromagnetic energy toward an angular region within the containment vessel.

11. A system for removing moisture and insect infestations from grains stored in a containment vessel, comprising:

means for providing electromagnetic energy into the grains;

means for providing an airflow through the grains; and means for selective heating of the grains and insects through the selective control of moisture content of the grains and insects.

12. A system for selectively heating grains to remove moisture and kill insects, the system comprising:

a containment vessel stored with grains;

a transmission line network configured to receive electromagnetic energy, the transmission line network including:

a first conductor;

a second conductor angularly spaced with the first conductor to provide the electromagnetic energy within the grains and remove the moisture;

an electromagnectic energy source connected to the first conductor;

a grain vapor extraction system having:

an air blower to provide an airflow through the grains within the containment vessel; and a heat exchange system for heating the airflow provided by the air blower to provide airflow through the grains; and an adjustable tuning mechanism for improving the impedance matching between the grain vapor extraction system and the grains.

* * * * *